(12) United States Patent
Awano et al.

(10) Patent No.: US 7,169,510 B2
(45) Date of Patent: Jan. 30, 2007

(54) NONAQUEOUS ELECTROLYTIC SOLUTION AND NONAQUEOUS SECONDARY BATTERY USING THE SAME

(75) Inventors: Naomi Awano, Kariya (JP); Kyohei Usami, Kariya (JP); Naohiro Kubota, Tokyo (JP)

(73) Assignees: Denso Corporation, Aichi (JP); Asahi Denka Co., Ltd., Tokyo (JP)

( * ) Notice: Subject to any disclaimer, the term of this patent is extended or adjusted under 35 U.S.C. 154(b) by 206 days.

(21) Appl. No.: 10/600,452

(22) Filed: Jun. 23, 2003

(65) Prior Publication Data

US 2004/0007688 A1   Jan. 15, 2004

(30) Foreign Application Priority Data

Jul. 5, 2002   (JP)   ............... 2002-196750

(51) Int. Cl.
*H01M 6/14*   (2006.01)
*H01M 6/16*   (2006.01)

(52) U.S. Cl. ............ 429/302; 429/188; 429/306; 429/324; 429/330; 429/332; 429/199; 252/62.2

(58) Field of Classification Search ............ 429/302, 429/188, 306, 324, 330, 332, 199; 252/62.2
See application file for complete search history.

(56) References Cited

U.S. PATENT DOCUMENTS 5,571,638 A    11/1996  Satoh et al.
6,872,493 B2 *  3/2005  Yamada et al. ............ 429/313

FOREIGN PATENT DOCUMENTS

EP   1 209 755   5/2002
JP   10-055822   2/1988
JP   10-326611   12/1998
JP   11-016602   1/1999
JP   11-162508 * 6/1999
JP   2001-006683  1/2001
JP   2001-068153  3/2001
JP   2002-134169 * 5/2002
JP         134169  5/2002

OTHER PUBLICATIONS

Popall, M. et al., ORMOCERs as inorganic-orgainic electrolytes for new solid state lithium batteries and supercapacitors, 1998, Electrochimica Acta, 43 (10-11), 1155-1161.*

* cited by examiner

*Primary Examiner*—Patrick Joseph Ryan
*Assistant Examiner*—Angela J. Martin
(74) *Attorney, Agent, or Firm*—Young & Thompson

(57) ABSTRACT

A nonaqueous electrolytic solution comprising an electrolyte salt dissolved in an organic solvent is disclosed. The nonaqueous electrolytic solution contains a silicon compound represented by formula (I):

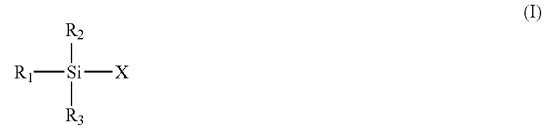

wherein $R_1$ represents an alkenyl group having 2 to 10 carbon atoms; $R_2$ and $R_3$ each represent an alkyl group having 1 to 10 carbon atoms, an alkoxy group having 1 to 10 carbon atoms, an alkenyl group having 2 to 10 carbon atoms or a halogen atom; and X represents a halogen atom.

20 Claims, 2 Drawing Sheets

NONAQUEOUS ELECTROLYTIC SOLUTION AND NONAQUEOUS SECONDARY BATTERY USING THE SAME

BACKGROUND OF THE INVENTION

The present invention relates to a nonaqueous electrolytic solution containing a specific silicon compound and a nonaqueous secondary battery containing the same. More particularly, it relates to a nonaqueous electrolytic solution containing the silicon compound and capable of providing a battery which shows reduced changes in electrical capacity and internal resistance in charge and discharge cycle repetition and undergoes a reduced change in internal resistance at low temperature and thereby maintains high electrical capacity, namely, a battery excellent in cycle characteristics and low-temperature characteristics. The present invention also relates to a nonaqueous secondary battery comprising the nonaqueous electrolytic solution.

With the recent spread of portable electronic equipment such as portable personal computers and handy video cameras, nonaqueous secondary batteries realizing high voltage and high energy density have enjoyed wide use as a power source of such equipment. There will be a growing demand for nonaqueous secondary batteries applied to electric vehicles and gas-and-electric powered hybrid vehicles that are now being put to practical use from the standpoint of environmental conservation.

However, the state-of-the-art nonaqueous secondary batteries lack reliability as a stable power source because they undergo reduction of capacity and increase of internal resistance when used in low temperature or repeatedly charged and discharged.

Various additives have been proposed for improving performance stability or electric characteristics of nonaqueous secondary batteries. For example, JP-A-10-326611 teaches use of tetramethyl silicate as an organic solvent of a nonaqueous electrolytic solution. The battery proposed exhibits improved cycle characteristics but has the capacity reduction problem. JP-A-10-55822 proposes a flame-retardant electrolytic solution which comprises a silane compound, e.g., octyltriethoxysilane, as a flame-retardant organic solvent. While showing improved flame resistance, this technique is still unsatisfactory in electric characteristics. JP-A-11-16602 discloses an electrolytic solution containing an organosilicon compound having an Si—N bond. This technique succeeds to some extent in preventing generation of hydrohalogenic acid due to water's entering and thereby preventing deterioration of a battery in some extent but is not sufficiently satisfactory in cycle characteristics. JP-A-2002-134169 discloses an electrolytic solution containing a silicon compound having an unsaturated bond. While excellent in cycle characteristics and low-temperature characteristics, this electrolytic solution is insufficient in stability in long-term use.

SUMMARY OF THE INVENTION

An object of the present invention is to provide a nonaqueous electrolytic solution capable of providing such a battery that shows reduced changes in electrical capacity and internal resistance in charge/discharge cycles and undergoes a reduced increase in internal resistance at low temperature and thereby maintains high electrical capacity, namely, that is excellent in cycle characteristics, low-temperature characteristics and stability in long-term.

Another object of the present invention is to provide a nonaqueous secondary battery comprising the nonaqueous electrolytic solution.

As a result of extensive investigations, the present inventors have found that a nonaqueous electrolytic solution containing a silicon compound having a specific structure provides a battery excellent in cycle characteristics and low-temperature characteristics.

The present invention provides a nonaqueous electrolytic solution comprising an electrolyte salt dissolved in an organic solvent, which contains a silicon compound represented by formula (I):

wherein $R_1$ represents an alkenyl group having 2 to 10 carbon atoms; $R_2$ and $R_3$ each represent an alkyl group having 1 to 10 carbon atoms, an alkoxy group having 1 to 10 carbon atoms, an alkenyl group having 2 to 10 carbon atoms or a halogen atom; and X represents a halogen atom.

The present invention also provides a nonaqueous secondary battery comprising the nonaqueous electrolytic solution.

BRIEF DESCRIPTION OF THE ACCOMPANYING DRAWINGS

The present invention will be more particularly described with reference to the accompanying drawings, in which.

DETAILED DESCRIPTION OF THE PREFERRED EMBODIMENTS

Figure 1:
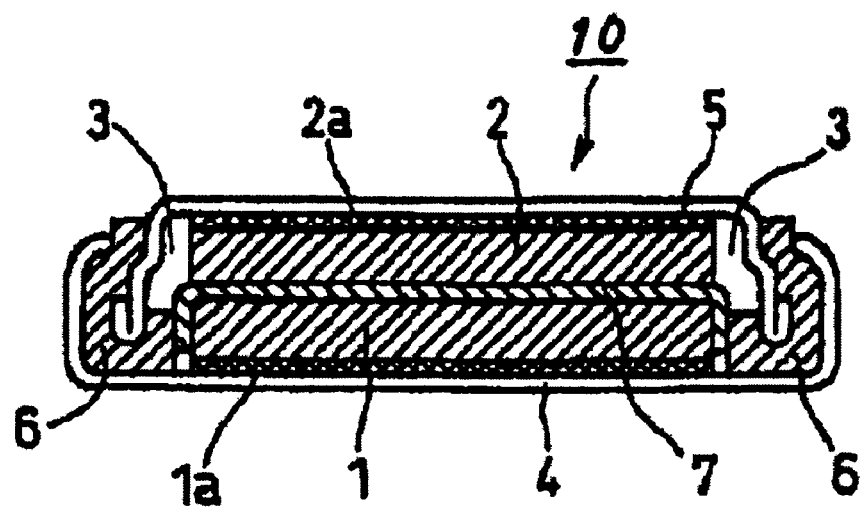
FIG. 1 is a schematic vertical-section of a coin type nonaqueous secondary battery.

In formula (I) representing the silicon compound used in the nonaqueous electrolytic solution of the present invention, the alkenyl group having 2 to 10 carbon atoms, as represented by $R_1$, $R_2$, and $R_3$, includes vinyl, allyl, 1-propenyl, isopropenyl, 2-butenyl, 1,3-butadienyl, 2-pentenyl, and 2-octenyl. The alkyl group having 1 to 10 carbon atoms, as represented by $R_2$ and $R_3$, includes methyl, ethyl, propyl, butyl, sec-butyl, tert-butyl, pentyl, hexyl, heptyl, octyl, 2-ethylhexyl, nonyl, and decyl. The alkoxy group having 1 to 10 carbon atoms, as represented by $R_2$ and $R_3$, includes those derived from the above-recited alkyl groups having 1 to 10 carbon atoms. The halogen atom as represented by X, $R_2$, and $R_3$ includes fluorine, chlorine, bromine, and iodine.

Of the silicon compounds represented by formula (I), preferred are those in which $R_1$ is a vinyl group, those in which at least one of $R_2$ and $R_3$ is a methyl group, and those in which X is a fluorine atom. These preferred silicon compounds specifically include, but are not limited to, compound Nos. 1 through 14 shown below.

Compound No. 1
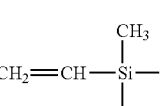

Compound No. 2
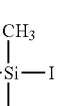

Compound No. 3
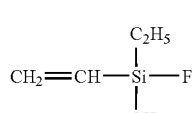

Compound No. 4
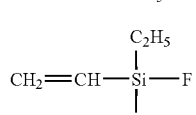

Compound No. 5
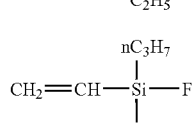

Compound No. 6
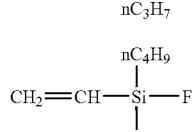

Compound No. 7
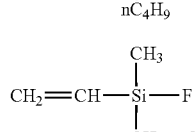

Compound No. 8
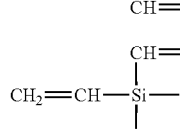

Compound No. 9
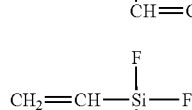

Compound No. 10
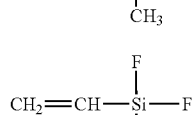

Compound No. 11
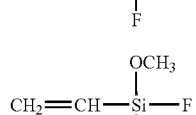

Compound No. 12
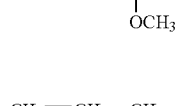

Compound No. 13

-continued

Compound No. 14
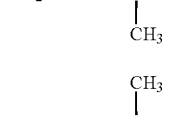

The silicon compound (I) self-polymerizes easily. It is considered that the silicon compound (I) polymerizes in the electrode interface in the initial stage of charge/discharge cycles to form a stable polymer film, whereby an increase in interfacial resistance with cycles must be suppressed. To fully manifest this effect, the silicon compound (I) is desirably present in the nonaqueous electrolytic solution in an amount of 0.05 to 5% by volume, particularly 0.1 to 3% by volume. Amounts less than 0.05% by volume hardly produce a substantial effect. Addition of more than 5% by volume produces no further effect only to waste the material, rather it adversely influences the characteristics of the electrolytic solution.

The silicon compound (I) is added to the organic solvent. At least one organic solvent selected from those commonly employed in nonaqueous electrolytic solutions can be used. The organic solvent preferably comprises at least one member selected from the group consisting of a cyclic carbonate compound, a cyclic ester compound, a sulfone compound, a sulfoxide compound, an amide compound, an acyclic carbonate compound, an acyclic ether compound, a cyclic ether compound, and an acyclic ester compound. Still preferably, the organic solvent comprises at least one cyclic carbonate compound and at least one acyclic carbonate compound. The combined use of the cyclic/acyclic carbonate compounds not only assures excellent cycle characteristics but achieves a good balance between the viscosity of the electrolytic solution and the performance of the resulting battery such as capacity and output.

Specific but non-limiting examples of the organic solvents that can be used in the present invention will described below.

The cyclic carbonate compound, cyclic ester compound, sulfone compound, sulfoxide compound, and amide compound serve to increase dielectric constant of the electrolytic solution because of their high permittivity. Examples of the cyclic carbonate compound are ethylene carbonate, (EC), propylene carbonate (PC), vinylene carbonate (VC), dimethylvinylene carbonate, 1,2-diphenylvinylene carbonate, 1,2-butylene carbonate (BC), 2-methyl-1,2-butylene carbonate, 1,1-dimethylethylene carbonate (i.e., isobutylene carbonate), 2,3-butylene carbonate, 1,3-propylene carbonate, 2-methyl-1,3-propylene carbonate, and 3-methyl-1,3-propylene carbonate. Examples of the cyclic ester compound are γ-butyrolactone and γ-valerolactone. The sulfone and sulfoxide compounds include sulfolane, sulfolene, tetramethylsulfolane, diphenylsulfone, dimethylsulfone, and dimethyl sulfoxide, with sulfolane compounds being preferred. Examples of the amide compound are N-methylpyrrolidone, dimethylformamide, and dimethylacetamide.

The acyclic carbonate compound, acyclic and cyclic ether compounds, and acyclic ester compound are effective in lowering the viscosity of the nonaqueous electrolytic solution. They facilitate migration of electrolyte ions, leading to excellent battery characteristics such as output density. They secure high performance of the nonaqueous electrolytic solution in low temperature because of their low viscosity. Examples of the acyclic carbonate compound are dimethyl carbonate (DMC), ethylmethyl carbonate (EMC), diethyl carbonate (DEC), ethyl-n-butyl carbonate, methyl-t-butyl carbonate, di-isopropyl carbonate, and t-butylisopropyl carbonate. The acyclic and cyclic ether compounds include dimethoxyethane (DME), ethoxymethoxyethane, diethoxyethane, tetrahydrofuran, dioxolane, dioxane, 1,2-bis(ethoxycarbonyloxy)ethane, 1,2-bis(ethoxycarbonyloxy)ethane, 1,2-bis(ethoxy-carbonyloxy)propane, ethylene glycol bis (trifluoroethyl) ether, isopropylene glycol trifluoroethyl ether, ethylene glycol bis(trifluoromethyl) ether, and diethylene glycol bis(trifluoroethyl) ether, with dioxolane compounds being preferred of them. The acyclic ester compound includes a carboxylic ester compound represented by formula (II):

wherein R represents an alkyl group having 1 to 4 carbon atoms; and n represents 0, 1 or 2.

In formula (II), the alkyl group having 1 to 4 carbon atoms includes methyl, ethyl, propyl, isopropyl, butyl, sec-butyl, and t-butyl. The ester of formula (II) includes methyl formate, ethyl formate, methyl acetate, ethyl acetate, propyl acetate, sec-butyl acetate, butyl acetate, methyl propionate, and ethyl propionate. The ester (II) has a low solidification point. When added to the organic solvent, especially a mixed organic solvent system comprising the cyclic carbonate compound and the acyclic carbonate compound, the ester (II) is effective in improving low-temperature battery characteristics. A preferred amount of the ester (II) to be added is 1 to 50% by volume in the total organic solvent.

In addition to the above-recited organic solvents, acetonitrile, propionitrile, nitromethane, and derivatives thereof are also useful in the present invention.

The electrolytic solution according to the present invention preferably comprises at least one cyclic carbonate compound and at least one acyclic carbonate compound. A combination of ethylene carbonate and 1,2-butylene carbonate as cyclic carbonate compounds is particularly preferred. A combination of acyclic carbonate compounds selected from dimethyl carbonate, ethylmethyl carbonate, and diethyl carbonate is particularly preferred.

The content of the cyclic carbonate compound is 20 to 50% by volume, preferably 25 to 40% by volume, based on the total organic solvent. Where the cyclic carbonate compound content is less than 20% by volume, the dielectric constant of the electrolytic solution reduces. Addition of more than 50% by volume of the cyclic carbonate compound can result in deterioration of low-temperature performance. The content of the acyclic carbonate compound is 50 to 80% by volume, preferably 55 to 75% by volume, based on the total organic solvent. Where the acyclic carbonate compound content is less than 50% by volume, the effect in improving the low-temperature characteristics is insufficient. Addition of more than 80% by volume can fail to obtain a sufficient dielectric constant. The total content of the cyclic carbonate compound and the acyclic carbonate compound is 70% by volume or higher based on the total organic solvent. Accordingly, the content of the other solvents that may be added if desired is up to 30% by volume.

The nonaqueous electrolytic solution can be made flame-retardant by addition of an appropriate flame retardant of halogen type, phosphorus type or other types. Phosphorus type flame retardants include phosphoric esters, such as trimethyl phosphate and triethyl phosphate.

A preferred amount of the flame retardant is 5 to 100% by weight, particularly 10 to 50% by weight, based on the total organic solvent. Sufficient flame retardation is not achieved with less than 5% of the flame retardant.

The electrolyte salt which can be used in the nonaqueous electrolytic solution of the present invention is conventional. Useful electrolyte salts include $LiPF_6$, $LiBF_4$, $LiAsF_6$, $LiCF_3SO_3$, $LiN(CF_3SO_2)_2$, $LiC(CF_3SO_2)_3$, $LiSbF_6$, $LiSiF_5$, $LiAlF_4$, $LiSCN$, $LiClO_4$, $LiCl$, $LiF$, $LiBr$, $LiI$, $LiAlCl_4$, $NaClO_4$, $NaBF_4$, $NaI$, and derivatives thereof. In view of excellent electrical characteristics, it is preferred to use at least one member selected from the group consisting of $LiPF_6$, $LiBF_4$, $LiClO_4$, $LiAsF_6$, $LiCF_3SO_3$, $LiN(CF_3SO_2)_2$, $LiC(CF_3SO_2)_3$, an $LiCF_3SO_3$ derivative, an $LiN(CF_3SO_2)_2$ derivative, and an $LiC(CF_3SO_2)_3$ derivative.

The electrolyte salt is preferably dissolved in the organic solvent in a concentration of 0.1 to 3.0 mol/l, particularly 0.5 to 2.0 mol/l. Electrolyte concentrations lower than 0.1 mol/l can result in a failure to obtain sufficient electric current density. Concentrations higher than 3.0 mol/l can impair the stability of the nonaqueous electrolytic solution.

The nonaqueous electrolytic solution is suited for use in primary and secondary batteries, especially nonaqueous secondary batteries described infra.

Electrodes of a battery include a cathode (positive electrode) and an anode (negative electrode). The cathode includes a sheet electrode prepared by coating a current collector with a slurry of a cathode active material mixture (i.e., a cathode active material, a binder, and a conductive material slurried with an organic solvent or water), followed by drying. The cathode active material includes $TiS_2$, $TiS_3$, $MoS_3$, $FeS_2$, $Li_{(1-x)}MnO_2$, $Li_{(1-x)}Mn_2O_4$, $Li_{(1-x)}CoO_2$, $Li_{(1-x)}NiO_2$, $LiV_2O_3$, and $V_2O_5$, wherein x represents a number of 0 to 1. Preferred of them are lithium-transition metal complex oxides, such as $LiCoO_2$, $LiNiO_2$, $LiMn_2O_4$, $LiMnO_2$, and $LiV_2O_3$. The binders for the cathode active material include, but are not limited to, polyvinylidene fluoride, polytetrafluoroethylene, ethylene-propylene-diene terpolymer (EPDM), styrene-butadiene rubber (SBR), acrylonitrile-butadiene rubber (NBR), and fluororubber.

The anode includes a sheet electrode prepared by coating a current collector with a slurry of an anode active material mixture (i.e., an anode active material and a binder slurried with an organic solvent or water), followed by drying. The anode active material includes lithium, lithium alloys, inorganic compounds, such as tin compounds, carbonaceous materials, and conductive polymers. Particularly preferred are carbonaceous materials capable of intercalating and deintercalating lithium ions of high safety. Such carbonaceous materials include, but are not limited to, graphite, petroleum coke, coke, petroleum pitch coke, pitch coke, carbonized resins (e.g., carbonized phenol resins and carbonized crystalline cellulose resins), partial carbonization products of (petroleum) pitch or the resins, furnace black, acetylene black, pitch-based carbon fiber, and PAN-based carbon fiber. The binders for the anode active material are the same as those recited for the cathode active material.

The conductive material for the cathode includes, but is not limited to, fine particles of graphite, carbon black (e.g., acetylene black) and amorphous carbon (e.g., needle-like coke). The solvent to be used for preparing the slurry is usually selected from organic solvents capable of dissolving the binder. Useful organic solvents include, but are not limited to, N-methylpyrrolidone, dimethylformamide, dimethylacetamide, methyl ethyl ketone, cyclohexanone, methyl acetate, methyl acrylate, diethyltriamine, N,N-dimethylaminopropylamine, ethylene oxide, and tetrahydrofuran.

The current collector material for the anode is usually chosen from copper, nickel, stainless steel, nickel-plated steel, and the like, and that for the cathode from aluminum, stainless steel, nickel-plated steel, and the like.

A separator is disposed between the cathode and the anode in the nonaqueous secondary battery of the present invention. Microporous resin films commonly employed in the art can be used as the separator with no particular limitation. The resins include polyethylene, polypropylene, polyvinylidene fluoride, polyvinylidene chloride, polyacrylonitrile, polyacrylamide, polytetrafluoroethylene, polysulfone, polyether sulfone, polycarbonate, polyamide, polyimide, polyethers, such as polyethylene oxide and polypropylene oxide, cellulosic resins, such as carboxymethyl cellulose and hydroxypropyl cellulose, and poly(meth) acrylic acid and various esters thereof; derivatives of these polymers; copolymers comprising the units of these polymers; and mixtures of these polymers, derivatives and copolymers. The resin films may be used either alone or in the form of a composite laminate thereof. The resin film can contain appropriate amounts of appropriate additives with no particular restriction. Films made of polyethylene, polypropylene, polyvinylidene fluoride or polysulfone are preferred for use in the nonaqueous secondary battery of the present invention.

The resin film as a separator is microporous to allow the electrolytic solution to penetrate and the ions to pass through. A microporous resin film can be prepared by, for example, a phase separation method or a stretching method. The phase separation method comprises molding a resin solution into a film while inducing micro-phase separation and removing the solvent from the film by extraction thereby to leave micropores. The stretching method comprises extruding a molten resin at a high drawdown ratio, heat-treating the extruded film to unidirectionally orient the polymer crystals, and further stretching the film to form voids between the crystals. An appropriate method is selected according to the material. The phase separation method is preferred to prepare a polyethylene film or a polyvinylidene fluoride film, which is preferably used in the nonaqueous secondary battery of the present invention.

For the purpose of improving safety, the electrode materials, the nonaqueous electrolytic solution, and the separators can contain phenol antioxidants, phosphorus antioxidants, thioether antioxidants, hindered amine compounds, and so forth. When added to the electrode material, the additives is preferably used in an amount of 0.01 to 10 parts by weight, particularly 0.05 to 5 parts by weight, per 100 parts by weight of the electrode material.

The phenol antioxidants include 1,6-hexamethylenebis [(3-t-butyl-5-methyl-4-hydroxyphenyl)propionic acid amide], 4,4'-thiobis(6-t-butyl-m-cresol), 4,4'-butylidenebis (6-t-butyl-m-cresol), 1,1,3-tris(2-methyl-4-hydroxy-5-t-butylphenyl)butane, 1,3,5-tris(2,6-dimethyl-3-hydroxy-4-t-butylbenzyl) isocyanurate, 1,3,5-tris(3,5-di-t-butyl-4-hydroxybenzyl) isocyanurate, 1,3,5-tris(3,5-di-t-butyl-4-hydroxybenzyl)-2,4,6-trimethylbenzene, tetrakis[methyl 3-(3,5-di-t-butyl-4-hydroxyphenyl)propionate]methane, thiodiethylene glycol bis[(3,5-di-t-butyl-4-hydroxyphenyl) propionate], 1,6-hexamethylenebis[(3,5-di-t-butyl-4-hydroxyphenyl)propionate], ethylene glycol bis[3,3-bis(4-hydroxy-3-t-butylphenyl)butyrate], bis[2-t-butyl-4-methyl-6-(2-hydroxy-3-t-butyl-5-methylbenzyl)phenyl] terephthalate, 1,3,5-tris[(3,5-di-t-butyl-4-hydroxyphenyl)propionyloxyethyl]isocyanuarate, 3,9-bis[1,1-dimethyl-2-{(3-t-butyl-4-hydroxy-5-methylphenyl)propionyloxy}ethyl]-2,4,8,10-tetraoxaspiro[5.5]undecane, and triethylene glycol bis[(3-t-butyl-4-hydroxy-5-methylphenyl)propionate].

The phosphorus antioxidants include trisnonylphenyl phosphite, tris[2-t-butyl-4-(3-t-butyl-4-hydroxy-5-methylphenylthio)-5-methylphenyl] phosphite, tridecyl phosphite, octyldiphenyl phosphite, di(decyl)monophenyl phosphite, di(tridecyl) pentaerythritol diphosphite, di(nonylphenyl)pentaerythritol diphosphite, bis(2,4-di-t-butylphenyl)pentaerythritol diphosphite, bis(2,6-di-t-butyl-4-methylphenyl)pentaerythritol diphosphite, bis(2,4,6-tri-t-butylphenyl)pentaerythritol diphosphite, bis(2,4-dicumuylphenyl)pentaerythritol diphosphite, tetra(tridecyl) isopropylidene diphenol diphosphite, tetra(tridecyl)-4,4'-n-butylidenebis(2-t-butyl-5-methylphenol)diphosphite, hexa (tridecyl)-1,1,3-tris(2-methyl-4-hydroxy-5-t-butylphenyl) butane triphosphite, tetrakis(2,4-di-t-butylphenyl) biphenylene diphosphonite, 9,10-dihydro-9-oxa-10-phosphaphenanthrene-10-oxide, 2,2'-methylenebis(4,6-di-t-butylphenyl)2-ethylhexyl phosphite, 2,2'-methylenebis(4,6-di-t-butylphenyl)octadecyl phosphite, 2,2'-ethylidenebis(4, 6-di-t-butylphenyl) fluorophosphite, tris(2-[(2,4,8,10-tetrakis-t-butyl dibenzo[d,f][1,3,2]dioxaphosphepin-6-yl) oxy]ethyl)amine, and 2-ethyl-2-butyl propylene glycol 2,4, 6-tri-t-butylphenol phosphite.

The thioether antioxidants include dialkyl thiodipropionates, such as dilauryl thiodipropionate, dimyristyl thiodipropionate, and distearyl thiodipropionate, and a pentaerythritol tetra(β-alkylmercaptopropionate).

The hindered amine compounds include 2,2,6,6-tetramethyl-4-piperidyl stearate, 1,2,2,6,6-pentamethyl-4-piperidyl stearate, 2,2,6,6-tetramethyl-4-piperidyl benzoate, bis (2,2,6,6-tetramethyl-4-piperidyl) sebacate, tetrakis(2,2,6,6-tetramethyl-4-piperidyl)1,2,3,4-butanetetracarboxylate, tetrakis(1,2,2,6,6-pentamethyl-4-piperidyl)1,2,3,4-butanetetracarboxylate, bis(2,2,6,6-tetramethyl-4-piperidyl)di (tridecyl)1,2,3,4-butanetetracarboxylate, bis(1,2,2,6,6-pentamethyl-4-piperidyl)di(tridecyl) 1,2,3,4-butanetetracarboxylate, bis(1,2,2,4,4-pentamethyl-4-piperidyl)-2-butyl-2-(3,5-di-t-butyl-4-hydroxybenzyl) malonate, 1-(2-hydroxyethyl)-2,2,6,6-tetramethyl-4-piperidinol/diethyl succinate polycondensates, 1,6-bis(2,2,6,6-tetramethyl-4-piperidyl-amino)hexane/2,4-dichloro-6-morpholino-s-triazine polycondensates, 1,6-bis(2,2,6,6-tetramethyl-4-piperidylamino)hexane/2,4-dichloro-6-t-octylamino-s-triazine poly-condensates, 1,5,8,12-tetrakis[2, 4-bis(N-butyl-N-(2,2,6,6-tetramethyl-4-piperidyl)amino)-s-triazin-6-yl]-1,5,8,12-tetraazadodecane, 1,5,8,12-tetrakis[2, 4-bis(N-butyl-N-(1,2,2,6,6-pentamethyl-4-piperidyl) amino)-s-triazin-6-yl]-1,5,8,12-tetraazadodecane, 1,6,11-tris[2,4-bis(N-butyl-N-(2,2,6,6-tetramethyl-4-piperidyl) amino)-s-triazin-6-yl]aminoundecane, and 1,6,11-tris[2,4-bis(N-butyl-N-(1,2,2,6,6-pentamethyl-4-piperidyl)amino)-s-triazin-6-yl]aminoundecane.

The nonaqueous secondary battery according to the present invention is not limited in shape and can have various shapes, such as a coin shape, a cylindrical shape, an angular shape, and the like. An example of a coin type nonaqueous secondary battery and an example of a cylindrical nonaqueous secondary battery, to which the present invention is applicable, are shown in FIGS. 1 to 3.

The coin type nonaqueous secondary battery 10 shown in FIG. 1 comprises a cathode 1 capable of deintercalating lithium ions, a cathode current collector 1a, an anode 2 made of a carbonaceous material capable of intercalating and deintercalating the lithium ions released from the cathode 1, an anode current collector 2a, a nonaqueous electrolytic solution 3 according to the present invention, a stainless steel cathode case 4, a stainless steel anode case 5, a polypropylene gasket 6, and a polyethylene separator 7.

Figure 2:
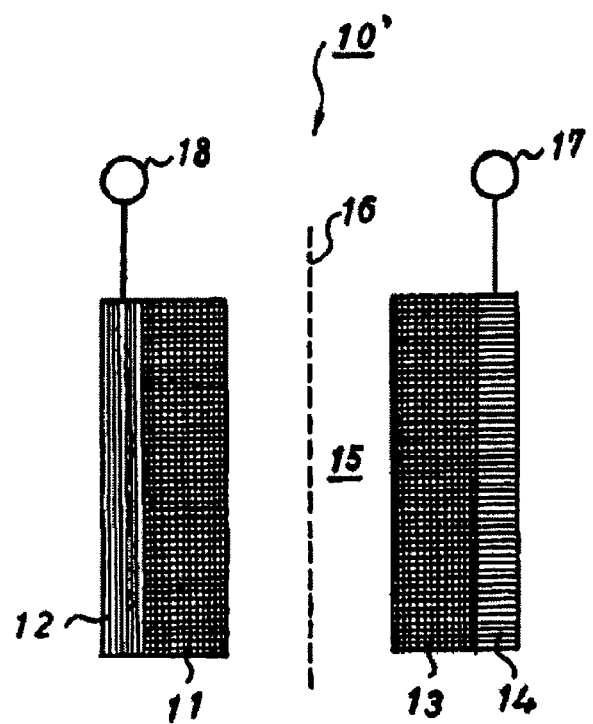
FIG. 2 is a schematic illustration showing the basic constitution of a cylindrical nonaqueous secondary battery.
Figure 3:
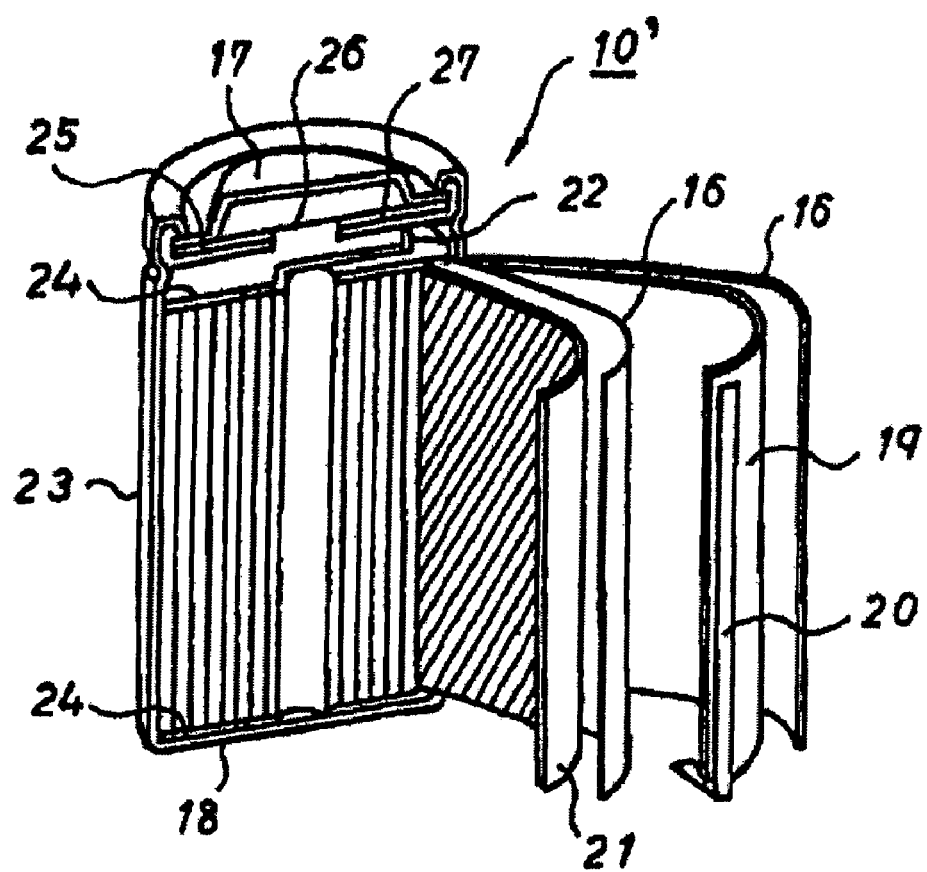
FIG. 3 is a perspective view of a cylindrical nonaqueous secondary battery, in which the inside structure is shown as a cross-sectional view and a partially exploded view.

The cylindrical nonaqueous secondary battery 10' shown in FIGS. 2 and 3 comprises an anode 11, an anode current collector 12, a cathode 13, a cathode current collector 14, a nonaqueous electrolytic solution 15 according to the present invention, a separator 16, a cathode terminal 17, an anode terminal 18, an anode plate 19, an anode lead 20, a cathode plate 21, a cathode lead 22, a battery case 23, an insulating plate 24, a gasket 25, a safety valve 26, and a PTC element 27.

The present invention will now be illustrated in greater detail with reference to Examples, but it should be understood that the invention is not construed as being limited thereto. Unless otherwise noted, all the parts are by weight.

Preparation of Cathode:

Eighty-five parts of $LiNiO_2$ as a cathode active material, 10 parts of acetylene black as a conductive agent, and 5 parts of polyvinylidene fluoride (PVDF) as a binder were mixed to prepare a cathode active material mixture. The mixture was dispersed in N-methyl-2-pyrrolidone (NMP) to make a slurry. The slurry was applied to both sides of a current collector made of aluminum, dried, and pressed to prepare a cathode plate, which was cut to a prescribed size. The active material mixture was scraped off the part of the cathode plate to which a lead tab was to be welded to prepare a cathode in a sheet form.

Preparation of Anode:

A mixture of 92.5 parts of a powdered carbon material as an anode active material and 7.5 parts of PVDF as a binder was dispersed in NMP to make a slurry. The resulting slurry was applied to both sides of a current collector made of copper, dried, and pressed to prepare an anode electrode, which was cut to a prescribed size. The active material mixture was scarped off the part of the anode plate to which a lead tab was to be welded to prepare an anode in a sheet form. Preparation of nonaqueous electrolytic solution:

$LiPF_6$ was dissolved in a mixed organic solvent (described later) in a concentration of 1 mol/l, and a test compound shown in Table 1 was added thereto to prepare a nonaqueous electrolytic solution.

Assembly of Battery:

The cathode and the anode were combined with a 25 μm thick microporous polypropylene film separator interposed therebetween and rolled up into a cylinder to form a cylindrical electrode. The cylindrical electrode was put into a case, with one end of a current collecting lead welded to the lead tab welding part of the cathode or the anode, and the other end of the lead bonded to the cathode terminal or anode terminal of the case, respectively. The electrolytic solution was poured into the case and sealed with a cap to prepare a cylindrical nonaqueous lithium secondary battery having a diameter of 18 mm and a height of 65 mm.

EXAMPLE 1 AND COMPARATIVE EXAMPLE 1

$LiPF_6$ was dissolved in a mixed solvent consisting of 30% by volume of ethylene carbonate, 40% by volume of ethylmethyl carbonate, and 30% by volume of dimethyl carbonate in a concentration of 1 mol/l, and a test compound shown in Table 1 was added thereto to prepare a nonaqueous electrolytic solution. A lithium secondary battery was assembled using the nonaqueous electrolytic solution. Cycle characteristics (discharge capacity retention (%) and internal resistance increase (%)) and low-temperature characteristics (discharge capacity ratio (%) and internal resistance ratio (%)) of the resulting cylindrical lithium secondary battery were measured as follows.

1) Cycle Characteristics

The battery was placed in a thermostat set at 60° C. and subjected to 500 cycles of a constant current charge at a charging current of 2.2 $mA/cm^2$ to 4.1 V and a constant current discharge at a discharging current of 2.2 $mA/cm^2$ to 3 V. The atmospheric temperature was lowered to 20° C., and the battery was subjected to a constant current constant voltage charge at a charging current of 1.1 $mA/cm^2$ to 4.1 V and a constant current discharge at a discharging current of 0.33 $mA/cm^2$ to 3.0 V.

A discharge capacity retention (%) was calculated from the discharge capacity in the final discharge and the initial discharge capacity according to the following equation. Additionally, the internal resistance at 20° C. was measured before and after the 500 charge/discharge cycles to obtain an internal resistance increase (%) from the following equation. The initial discharge capacity and the internal resistance were measured in accordance with methods (a) and (b) described below.

Discharge capacity retention (%)=[(discharge capacity after 500 cycles)/(initial discharge capacity)]×100

Internal resistance increase (%)=[(internal resistance after 500 cycles)/(internal resistance before 500 cycles)]×100 a) Method of Measuring Initial Discharge Capacity

The battery was subjected to a constant current constant voltage charge at a charging current of 0.25 $mA/cm^2$ up to 4.1 V and then a constant current discharge at a discharging current of 0.33 $mA/cm^2$ up to 3.0 V. Then, a constant current constant voltage charge at 1.1 $mA/cm^2$ to 4.1 V and a constant current discharge at a discharging current of 1.1 $mA/cm^2$ to 3.0 V were carried out four times. Finally, the battery was subjected to a constant current constant voltage charge at a charging current of 1.1 $mA/cm^2$ to 4.1 V and a constant current discharge at a discharging current of 0.33 $mA/cm^2$ to 3.0 V. The discharge capacity in the final discharge was taken as an initial battery capacity. The measurement was made in an atmosphere at 20° C.

b) Method of Measuring Internal Resistance

The battery was subjected to a constant current constant voltage charge at 1.1 $mA/cm^2$ to 3.75 V. An AC impedance spectrum was measured on a Solartron 1260 Frequency Resonance Analyzer in conjunction with a Potentiostat/Galvanostat Solartron 1287 (both supplied by Toyo Corp.) over a frequency range of 100 kHz to 0.02 Hz. The imaginary part and the real part of the complex impedance were plotted as ordinate and abscissa, respectively, to prepare a Cole-Cole plot. A circle best fit to the arch of the plot was depicted. The greater value of the two intersections of the circle with the real axis was taken as a resistance, which was taken as an internal resistance of the battery.

2) Low-Temperature Characteristics

The discharge capacity of the battery at 20° C. was measured in the same manner as for the initial discharge capacity in the cycle test. The discharge capacity was measured in the same manner as in the measurement of initial discharge capacity, except for changing the measuring temperature to −30° C. The discharge capacity ratio (%) was calculated from the discharge capacity at 20° C. and that at −30° C. according to equation:

Discharge capacity ratio (%)=[(discharge capacity at −30° C.)/(discharge capacity at 20° C.)]×100

The internal resistance was measured at 20° C. and −30° C. in the same manner as in the cycle test to obtain the internal resistance ratio according to equation:

Internal resistance ratio=(internal resistance at −30° C.)/(internal resistance at 20° C.)

The results obtained in the cycle test and the low-temperature test are shown in Table 1 below. While not shown in Table 1, the initial discharge capacities obtained in Example 1, Run Nos. 1 to 13 and Comparative Example 1, Run Nos. 2 and 3 were equal to or higher than that in Comparative Example 1, Run No. 1.

EXAMPLE 2 AND COMPARATIVE EXAMPLE 2

$LiPF_6$ was dissolved in a mixed solvent consisting of 10 vol % of ethylene carbonate, 20 vol % of 1,2-butylene carbonate (BC), 40 vol % of ethylmethyl carbonate, and 30 vol % of dimethyl carbonate in a concentration of 1 mol/l, and a test compound shown in Table 2 was added thereto to prepare a nonaqueous electrolytic solution. A lithium secondary battery was assembled using the nonaqueous electrolytic solution and evaluated in the same manner as in Example 1.

The results obtained in the cycle test and the low-temperature test are shown in Table 2. While not shown in Table 2, the initial discharge capacities measured in Example 2, Run Nos. 1 to 13 and Comparative Example 2, Run Nos. 2 and 3 were equal to or higher than that in Comparative Example 2, Run No. 1.

TABLE 1

| Run No. | Test Compound No. | Test Compound Amount (vol %) | Cycle Test (60° C., 500 cycles) Discharge Capacity Retention (%) | Cycle Test (60° C., 500 cycles) Internal Resistance Increase (%) | Low-Temperature Test Discharge Capacity Ratio (%) | Low-Temperature Test Internal Resistance Ratio |
|---|---|---|---|---|---|---|
| Examples 1: | | | | | | |
| 1 | 1 | 0.2 | 93.4 | 126 | 81 | 11.2 |
| 2 | 1 | 0.4 | 94.5 | 122 | 85 | 10.8 |
| 3 | 1 | 0.6 | 95.9 | 117 | 88 | 9.8 |
| 4 | 1 | 0.8 | 94.7 | 121 | 90 | 9.9 |
| 5 | 1 | 1.0 | 94.4 | 122 | 92 | 9.4 |
| 6 | 1 | 1.5 | 94.1 | 124 | 92 | 9.4 |
| 7 | 3 | 0.6 | 94.2 | 122 | 85 | 10.9 |
| 8 | 5 | 0.6 | 95.4 | 120 | 84 | 10.8 |
| 9 | 6 | 0.6 | 95.4 | 120 | 85 | 10.6 |
| 10 | 7 | 0.6 | 94.2 | 122 | 85 | 10.9 |
| 11 | 10 | 0.6 | 94.0 | 124 | 83 | 11.4 |
| 12 | 11 | 0.6 | 94.3 | 123 | 87 | 11.0 |
| 13 | 12 | 0.6 | 93.0 | 128 | 83 | 11.5 |
| Comparative Example 1: | | | | | | |
| 1 | | none | 78.0 | 153 | 58 | 18.1 |
| 2 | A* | 0.6 | 87.2 | 136 | 78 | 13.1 |
| 3 | B* | 0.6 | 86.4 | 140 | 75 | 14.8 |

*Comparative compound A:

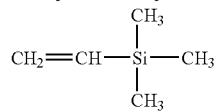

*Comparative compound B:

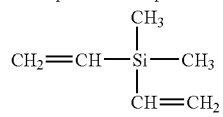

TABLE 2

| Run No. | Test Compound No. | Test Compound Amount (vol %) | Cycle Test (60° C., 500 cycles) Discharge Capacity Retention (%) | Cycle Test (60° C., 500 cycles) Internal Resistance Increase (%) | Low-Temperature Test Discharge Capacity Ratio (%) | Low-Temperature Test Internal Resistance Ratio |
|---|---|---|---|---|---|---|
| | | | Examples 2: | | | |
| 1 | 1 | 0.2 | 93.9 | 126 | 88 | 10.1 |
| 2 | 1 | 0.4 | 94.4 | 121 | 91 | 10.3 |
| 3 | 1 | 0.6 | 96.3 | 113 | 93 | 9.9 |
| 4 | 1 | 0.8 | 95.7 | 116 | 94 | 9.4 |
| 5 | 1 | 1.0 | 95.6 | 117 | 95 | 9.6 |
| 6 | 1 | 1.5 | 94.7 | 121 | 95 | 9.5 |
| 7 | 3 | 0.6 | 94.5 | 121 | 92 | 10.0 |
| 8 | 5 | 0.6 | 95.7 | 116 | 88 | 9.8 |
| 9 | 6 | 0.6 | 95.8 | 118 | 91 | 9.9 |
| 10 | 7 | 0.6 | 95.9 | 115 | 92 | 9.4 |
| 11 | 10 | 0.6 | 94.3 | 120 | 87 | 10.5 |
| 12 | 11 | 0.6 | 94.5 | 120 | 91 | 10.0 |
| 13 | 12 | 0.6 | 93.6 | 124 | 87 | 10.6 |
| | | | Comparative Example 2: | | | |
| 1 | none | | 78.7 | 150 | 62 | 16.5 |
| 2 | A | 0.6 | 87.7 | 135 | 84 | 11.9 |
| 3 | B | 0.6 | 86.9 | 136 | 78 | 13.5 |

As is apparent from the results in Tables 1 and 2, the nonaqueous electrolytic solutions of the present invention, which contain the silicon compound (I), provide nonaqueous secondary batteries excellent in low-temperature characteristics and cycle characteristics. The nonaqueous secondary batteries comprising a comparative nonaqueous electrolytic solution containing a comparative silicon compound show some improvement in initial low-temperature characteristics and cycle characteristics over that comprising a nonaqueous electrolytic solution containing no silicon compound but are still insufficient as compared with those comprising the electrolytic solution of the present invention.

While the mechanism of action of the silicon compound (I) in the nonaqueous secondary battery has not been clearly elucidated, the following assumption could be made. The silicon compound (I) polymerizes in the electrode interface to form a stable film. The film, being stable, controls side reactions between the electrodes and the nonaqueous electrolytic solution with charge/discharge cycles. As a result, an increase in internal resistance with cycles is suppressed, compared with the case adding no silicon compound. Besides, since the film has small resistance in low temperature, the battery is capable of retaining high discharge capacity even in low temperature.

The use of the nonaqueous electrolytic solution of the present invention containing a specific silicon compound provides a nonaqueous secondary battery excellent in cycle characteristics and low-temperature characteristics.

What is claimed is:

1. A nonaqueous secondary battery comprising:
a battery case;
a nonagueous electrolytic solution contained within said case, said nonaqueous electrolytic solution comprises electrolyte salt $LiPF_6$ dissolved in an organic solvent, and a silicon compound represented by formula (I):

wherein $R_1$ represents an alkenyl group having 2 to 10 carbon atoms; $R_2$ and $R_3$ each represent an alkyl group having 1 to 10 carbon atoms, an alkoxy group having 1 to 10 carbon atoms, or an alkenyl group having 2 to 10 carbon atoms; and X represents a halogen atom.

2. The nonaqueous secondary battery according to claim 1, wherein $R_1$ is a vinyl group.

3. The nonaqueous secondary battery according to claim 1, wherein at least one of $R_2$ and $R_3$ is a methyl group.

4. The nonaqueous secondary battery according to claim 1, wherein X is a fluorine atom.

5. The nonaqueous secondary battery according to claim 1, wherein $R_1$ is a vinyl group, $R_2$ and $R_3$ are each a methyl group, and X is a fluorine atom.

6. The nonaqueous secondary battery according to claim 1, wherein the organic solvent contains at least one member selected from the group consisting of a cyclic carbonate compound, a cyclic ester compound, a sulfone compound, a sulfoxide compound, an amide compound, an acyclic carbonate compound, an acyclic ether compound, a cyclic ether compound, and an acyclic ester compound.

7. The nonaqueous secondary battery according to claim 1, wherein the organic solvent contains at least one cyclic carbonate compound and at least one acyclic carbonate compound.

8. The nonaqueous secondary battery according to claim 7, wherein the cyclic carbonate compound comprises ethylene carbonate.

9. The nonaqueous secondary battery according to claim 7, wherein the cyclic carbonate compound comprises ethylene carbonate and 1,2-butylene carbonate.

10. The nonaqueous secondary battery according to claim 7, wherein the acyclic carbonate compound comprises at least one member selected from the group consisting of dimethyl carbonate, ethylmethyl carbonate, and diethyl carbonate.

11. The nonaqueous secondary battery according to claim 7, which further contains a carboxylic ester compound represented by formula (II):

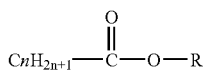
(II)

wherein R represents an alkyl group having 1 to 4 carbon atoms; and n represents 0, 1 or 2.

12. The nonaqueous secondary battery according to claim 1, wherein the silicon compound represented by formula (I) is present in an amount of 0.05 to 5% by volume.

13. The nonaqueous secondary battery according to claim 1, further comprising at least 5% by weight of a flame retardant, based on the total organic solvent.

14. The nonaqueous secondary battery according to claim 13, wherein the flame retardant is one of a halogen and a phosphorus.

15. The nonaqueous secondary battery according to claim 14, wherein the flame retardant is a phosphoric ester.

16. The nonaqueous secondary battery according to claim 1, further comprising 10% to 50% by weight of a flame retardant, based on the total organic solvent.

17. The nonaqueous secondary battery according to claim 16, wherein the flame retardant is one of a halogen and a phosphorus.

18. The nonaqueous secondary battery according to claim 17, wherein the flame retardant is a phosphoric ester.

19. The nonaqueous secondary battery according to claim 1, wherein said silicon compound forms a stable polymer film.

20. A nonaqueous electrolytic solution comprising electrolyte salt LiPF6 dissolved in an organic solvent and a non-ionic silicon compound represented by formula (I):

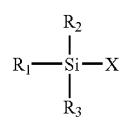
(I)

wherein R1 represents an alkenyl group having 2 to 10 carbon atoms; $R_2$ and $R_3$ each represent an alkyl group having 1 to 10 carbon atoms, an alkoxy group having 1 to 10 carbon atoms, or an alkenyl group having 2 to 10 carbon atoms; and X represents a halogen atom.

* * * * *